United States Patent [19]
Crook et al.

[11] Patent Number: 5,516,199
[45] Date of Patent: May 14, 1996

[54] COMBINED LOCK ORIENTATION AND BELT COMFORT MECHANISM

[75] Inventors: James E. Crook, Carmel; Guy R. Dingman, Elwood; Ronald F. Homeier, Plainfield; Chris P. Jessup, Sheridan, all of Ind.

[73] Assignee: Indiana Mills and Manufacturing, Inc., Westfield, Ind.

[21] Appl. No.: 380,377

[22] Filed: Jan. 30, 1995

Related U.S. Application Data

[63] Continuation-in-part of Ser. No. 307,528, Sep. 16, 1994.

[51] Int. Cl.⁶ .......................... B60R 22/00; B60R 22/28; B60R 22/353
[52] U.S. Cl. .......................... 297/468; 297/470; 297/476; 242/382.1
[58] Field of Search .......................... 242/382.1, 382.2, 242/382.3; 280/805, 807, 808; 297/474, 468, 475, 476, 477, 470, 471

[56] References Cited

U.S. PATENT DOCUMENTS

| | | | |
|---|---|---|---|
| 2,880,815 | 4/1959 | Apfelbaum | 280/805 |
| 3,424,494 | 1/1969 | McIntyre et al. | 297/468 |
| 3,606,456 | 9/1971 | Cazabon | 297/474 |
| 3,944,163 | 3/1976 | Hayashi et al. | 242/382.1 |
| 3,945,586 | 3/1976 | Higbee et al. | 242/382.1 |
| 3,947,058 | 3/1976 | LaPorte . | |
| 4,129,320 | 12/1978 | Fancy | 297/468 X |
| 4,201,418 | 5/1980 | Reidelbach et al. | 297/474 |
| 4,611,770 | 9/1986 | Cotter | 242/382.1 |
| 4,832,410 | 5/1989 | Bougher | 297/474 |
| 4,911,377 | 3/1990 | Lortz et al. | 242/382.1 |
| 5,292,181 | 3/1994 | Dybro | 297/468 |

*Primary Examiner*—John M. Jillions
*Attorney, Agent, or Firm*—Woodard, Emhardt, Naughton Moriarty & McNett

[57] ABSTRACT

An anti-cinch automatic locking retractor. A web spool is rotatably mounted between a pair of upstanding walls. The spool includes a pair of flanges each having a plurality of locking teeth with the teeth spaced apart by an included angle. A pawl is pivotally mounted to the walls and is lockingly engagable with the teeth. A cam plate mounted adjacent the spool and rotatable therewith includes a cam surface extending through an angle greater than the teeth included angle to limit cinching of the web spool as the spool rotates to and from the locking position and through the included angle. An additional slack reducing mechanism is mounted to the seat frame opposite from the side of the retractor and includes a pivot member for automatically aligning the attached locking device when not in use.

14 Claims, 6 Drawing Sheets

COMBINED LOCK ORIENTATION AND BELT COMFORT MECHANISM

CROSS REFERENCE TO RELATED APPLICATION

This application is a continuation-in-part of the commonly owned U.S. patent application Ser. No. 08/307,528, filed Sep. 16, 1994 and entitled ANTI-CINCH AUTOMATIC LOCKING RETRACTOR.

BACKGROUND OF THE INVENTION

1. Field of the Invention

This invention is in the field of retractors and slack pick up devices for use with seat belts.

2. Description of the Prior Art

The prior automatic locking retractor has a spring biased spool rotatably mounted to a bracket with a web extendable or retractable as the spool is wound. An elongated pawl is pivotally mounted to the bracket and is positioned to engage and lock with the ratchet shaped end flanges of the spool. The pawl is held apart from the flanges until the web is extended to the desired position and then slightly retracted. Thus, the retractor is automatically locked preventing further web extension once the web is pulled outwardly to the desired position and slightly released.

Two main types of automatic locking retractors have been provided for automatically locking the web once pulled outwardly to the desired position. Retractor 11 (FIG. 1) includes a bracket or frame 12 with a pair of spaced apart walls 13 between which is rotatably mounted the spool having web 14 wound thereon. A tongue or lock 15 is mounted to the distal end of the web. Gear 19 rotates with the spool and drives an intermediate gear 20 in meshing engagement with an internal tooth gear 16 rotatably mounted to frame 12. An outward projecting cam 17 fixedly mounted to gear 16 is movable against pawl 18 pivotally mounted between the pair of spaced apart walls 13 and positioned to lockingly engage the opposite ratchet shaped walls of the spool. Such a retractor is shown in the U.S. Pat. No. 3,945,586.

A second type of automatic locking retractor is shown in FIG. 2 and includes a frame 20 between which is rotatably mounted spool 21 having web 22 mounted thereon. Spring 23 is mounted to frame 20 and enclosed within cap 24 and rotatably drives spool 21 to the retracted position. Spool 21 is mounted to the opposite walls of bracket 20 by pin 25. Likewise, pawl 26 is mounted to bracket 20 and is positioned to lockingly engage the teeth 27 of spool 21. A cam plate 28 is mounted to pin 25 between spool wall 29 and wall 38 and is urged against wall 29 by means of a spring. Cam plate 28 has constant diameter except at the location of projection 30 and 31 separated apart by notch 32. The diameter of cam plate 28 is less than the diameter of wall 29 except at the location of projections 30 and 31 and notch 32 thereby ensuring that the teeth of wall 29 project outwardly of cam plate 28. The initial withdrawal of the retractor, that is, outward extension of the web, causes cam plate 28 to rotate positioning projection 30 adjacent pawl 26 and preventing the pawl from pivoting inwardly to engage the spool teeth. Once the web is slightly retracted from the fully extended position, cam plate 28 moves in a clockwise direction as viewed in FIG. 2 positioning notch 32 adjacent pawl 26 and allowing the pawl to pivot inwardly lockingly engaging the spool teeth. Further extension of the web is therefore prevented. Retraction of the web causes clockwise rotation of cam plate 28 positioning projection 31 adjacent the pawl thereby spacing the pawl apart from the teeth and allowing the spool to freely retract without the noise associated with the teeth contacting the pawl. If, however, the web is again extended before fully retracted, cam plate 28 will rotate in a counterclockwise direction as viewed in FIG. 2 causing the pawl to fall into notch 32 preventing further extension of the web.

A disadvantage with the previously described prior automatic locking retractors is that web will continually become tighter or cinch if the web is repeatedly retracted and extended in small amounts. Such cinching may occur if the vehicle seat moves with respect to the retractor. For example, trucks are typically driven over rough terrain resulting in extensive vertical movement of the occupant seat. Thus, once the seat belt harness or web is locked in place and the seat moves downwardly toward the vehicle floor, webbing will be slightly withdrawn into the retractor allowing one or more of the teeth of the spool to move past the pawl. Once the seat moves upwardly, force will be applied to the web to pull the web outwardly; however, at this time projection 31 will move apart from the pawl thereby locking the pawl within notch 32 resulting in tightening of the web. Several or even one such unplanned tightening is uncomfortable to the occupant.

In order to alleviate such cinching, the commonly owned U.S. Pat. No. 4,911,377 discloses an anti-cinch locking retractor having a floating cradle upon which the pawl is mounted to allow limited web extension and retraction. Other approaches include the retractor disclosed in U.S. Pat. No. 4,611,770. In the commonly owned U.S. Pat. No. 5,292,181, there is disclosed a variety of spring mechanisms mounted at different positions within the seat web harness to limit cinching of the web within the retractor. By positioning the spring mechanisms on the opposite sides of the seat, relative motion between the web and passenger is avoided thereby preventing the web from chafing the occupant. Disclosed herein is a different spring mechanism for further limiting cinching within the retractor.

In certain cases when a lock such as a seat buckle tongue is mounted to a retraction device, the tongue will contact the retracting device thereby positioning the tongue at a skewed angle relative to the longitudinal axis of the retraction device. When the occupant then tries to grasp the tongue for subsequent insertion into the buckle, the tongue is difficult to find and grasp. The retraction device disclosed herein includes an automatic orientation component for positioning the tongue to project outwardly along the longitudinal axis of the retracting device whenever the tongue is in an unlocked state. Spring loaded devices have been used to bias seat belt locks; however, none include the orientation component disclosed herein. For example, see the following U.S. patents: U.S. Pat. No. 3,947,058 issued to Laporte and U.S. Pat. No. 4,201,418 issued to Reidelbach et al. along with the commonly owned U.S. Pat. No. 4,832,410.

SUMMARY OF THE INVENTION

One embodiment of the present invention is an anti-cinch and anti-chafe seat belt system for restraining movement of a passenger on a seat on a frame. The system includes a belt with an outer end and an inner end mounted to a retractor secured to the frame. The retractor has a spool with at least a first locking tooth and a second locking tooth formed thereon and located apart by a first included angle. A pawl is movable into and out of locking engagement with the first tooth and the second tooth to limit rotation of the spool in a locking position. The retractor also includes a cam with a cam surface extending through a second included angle greater than the first included angle with the cam surface positionable against the pawl to limit cinching of the web spool as the spool rotates to and from the locking position through a third angle greater than the first included angle. A first locking device is mounted to the outer end of the belt and is lockingly engageable with a second locking device. A combined orientation and biasing mechanism with a longitudinal axis mounts the second locking device to the frame and is operable to first orient the second locking device to project along the longitudinal axis when the second locking device is unlocked from the first locking device and to second limit cinching of the belt relative to the retractor and also limit chafing movement of the belt relative to the passenger when the second locking device is locked to the first locking device and the combined orientation and biasing mechanism and the retractor are positioned on opposite sides of the seat.

It is an object of the present invention to provide an automatic locking retractor preventing web cinching.

Another object of the present invention is to provide a new and improved web retractor.

An additional object of the present invention is to provide means for automatically aligning a lock with its holder to facilitate grasping.

Yet a further object of the present invention is to provide a new and improved anti-cinch automatic locking retractor.

Related objects and advantages of the present invention will be apparent from the following description.

DESCRIPTION OF THE PREFERRED EMBODIMENT

Figure 1:
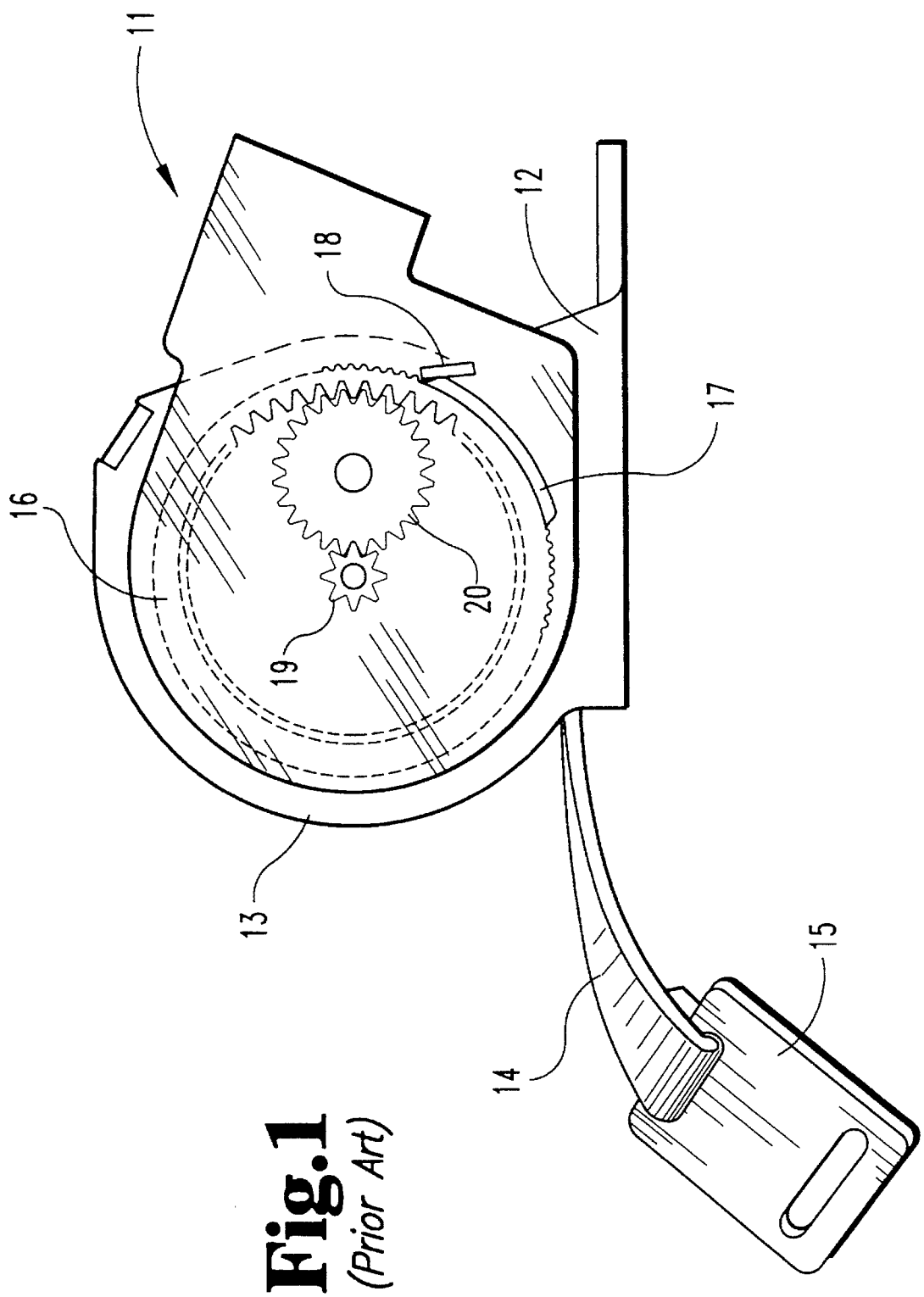
FIG. 1 is a side view of a prior art automatic locking retractor.

For the purposes of promoting an understanding of the principles of the invention, reference will now be made to the embodiment illustrated in the drawings and specific language will be used to describe the same. It will nevertheless be understood that no limitation of the scope of the invention is therby intended, such alterations and further modifications in the illustrated device, and such further applications of the principles of the invention as illustrated therein being contemplated as would normally occur to one skilled in the art to which the invention relates.

Figure 2:
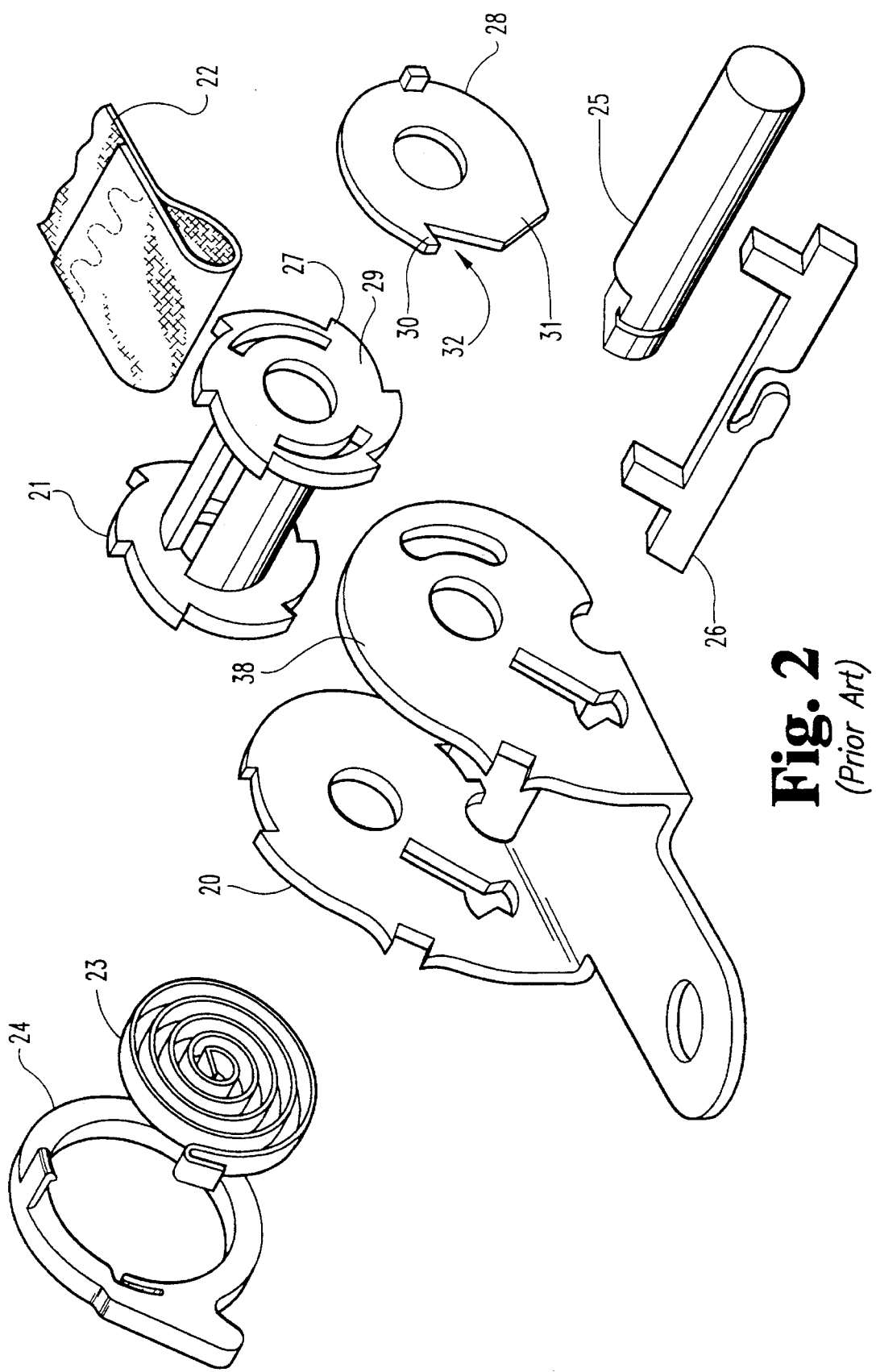
FIG. 2 is a perspective exploded view of another prior art automatic locking retractor.
Figure 3:
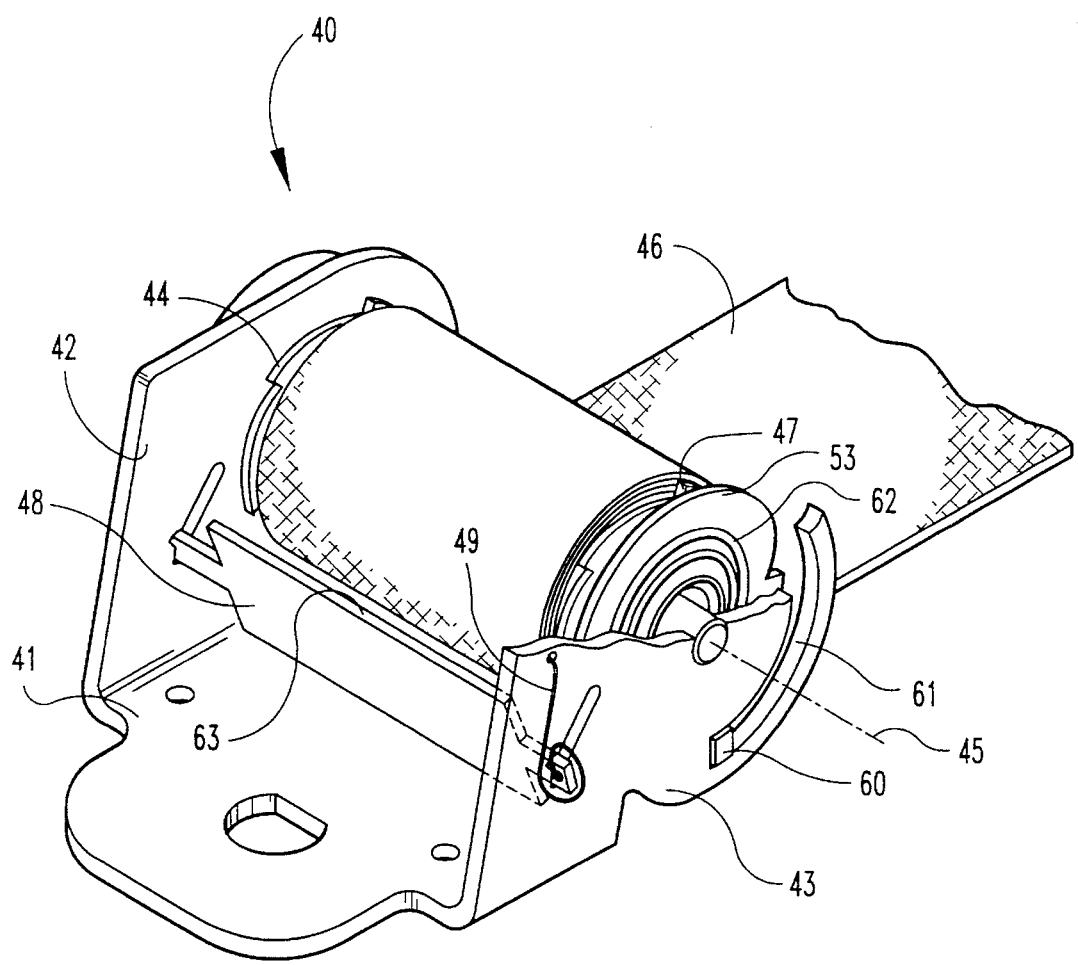
FIG. 3 is a perspective fragmentary view of the anti-cinch automatic locking retractor incorporating the present invention.
Figure 5:
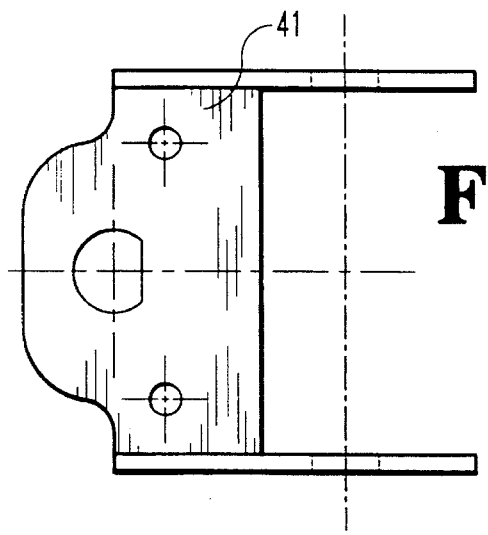
FIG. 5 is a top view of the frame of FIG. 4.

Referring now more particularly to FIG. 3, there is shown the anti-cinch automatic locking retractor 40 incorporating the present invention. Retractor 40 includes a frame 41 with a pair of upstanding walls 42 and 43, the later of which is shown fragmented to more clearly illustrate the cam plate. Frame 41 is adapted to be fixedly secured to the vehicle frame and includes a web spool 44 rotatably mounted about a longitudinal axis 45 extending through walls 42 and 43. Spool 44 includes a pair of end flanges 47 having a plurality of locking teeth positioned thereon. A spring 23 (FIG. 2) mounted to wall 42 is engaged with wall 42 and the spool and is operable to urge the spool to rotate in a clockwise direction as viewed in FIG. 3 to retract the web to a web retracted position. The spring is yieldable to allow the spool to rotate in a counterclockwise direction so that the web may be pulled to a maximum extended position. A pawl 48 is pivotally mounted in a pair of slots provided in walls 42 and 43 and is urged by wire spring 49 into locking engagement with the teeth formed on flanges 47 to limit the rotation of the spool in a counterclockwise direction once the web is pulled outwardly to the maximum extended position and then retracted slightly to the locking position. Retractor 40 may be identical to the retractor shown in FIG. 2 with exception of the design of the cam plate and the associated slot provided in wall 43.

Figure 6:
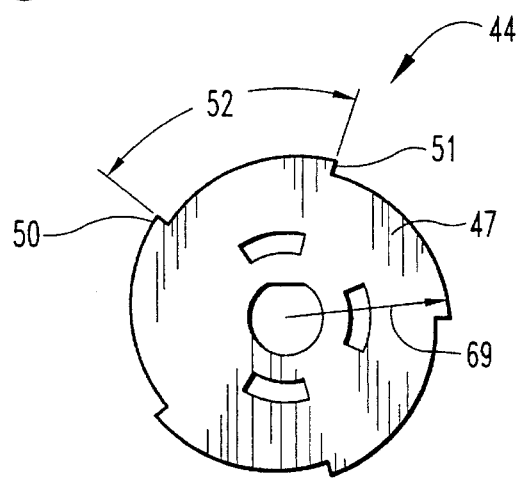
FIG. 6 is a side view of the web spool.

Spool 44 is rotatably mounted on longitudinal axis 45 and is identical to spool 21 with the exception that the spool of FIG. 2 is shown as having six teeth located on each end flange whereas the preferred embodiment of spool 44 has five locking teeth on each end flange. The number of teeth on each flange may be varied although the number of teeth on one end flange must be identical to the number of teeth on the opposite end flange. The teeth are positioned around the circumference of each end flange and are positioned apart by an included angle. For example, teeth 50 and 51 (FIG. 6) on end flange 47 are positioned apart by a first included angle 52. Since there are five teeth on end flange 47, included angle 52 is equal to 72°.

Figure 4:
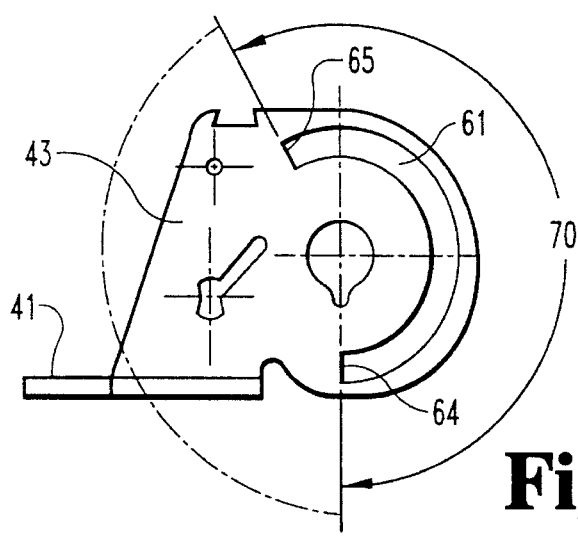
FIG. 4 is a side view of the retractor frame of FIG. 3.

Cam plate 53 (FIG. 7) is rotatably mounted to frame 41 about the rotational axis 45. Cam plate 53 has a constant diameter except at indented portion 54 forming a locking surface 55 located on a line intersecting longitudinal axis 45 and intersecting a sloping surface 56 extending outwardly to area 57 where it intersects the outside diameter of the cam plate. Likewise, locking surface 55 extends outwardly to area 58 intersecting the outside diameter of the cam plate. The circumferentially extending surface 68 located between and contiguous with areas 57 and 58 is located a constant radial distance 59 from axis 45. Areas 57 and 58 are located equidistant from axis 45. An ear 60 integral with the cam plate extends perpendicularly outwardly therefrom and into arcuate slot 61 (FIG. 4) provided on end wall 43 of frame 41. Cam plate 53 is mounted adjacent spool flange 47 and is located between flange 47 and wall 43. Spring 62 (FIG. 3) located between cam plate 53 (FIG. 3) and wall 43 urges the cam plate against spool flange 47 to rotate therewith but is yieldable to allow relative motion between the cam plate and flange when ear 60 contacts either end of arcuate slot 61. Cam plate 53 is positioned relative to the spool so that locking surface 55 can contact edge 63 of pawl 48 as the spool is rotated in a counterclockwise direction as viewed in FIG. 3.

Figure 7:
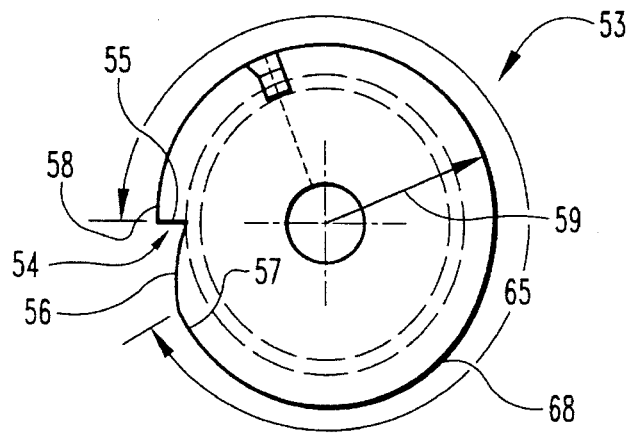
FIG. 7 is a side view of the cam plate.
Figure 8:
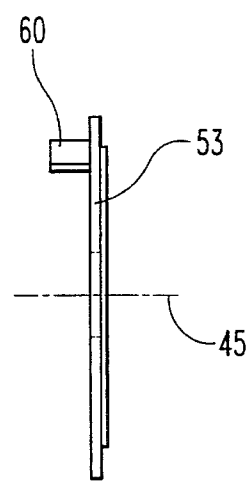
FIG. 8 is an end view of the cam plate of FIG. 7.

The circumferentially extending surface 68 (FIG. 7) has a constant radius 59 between areas 57 and 58 and forms a cam surface which extends from area 58 in a clockwise direction to area 57 as viewed in FIG. 7 through a second angle 65. Angle 65 is greater than the first included angle 52 (FIG. 6) extending between at least a pair of adjacent teeth 50 and 51. Radius 59 (FIG. 7) is greater than the maximum radius 69 (FIG. 6) extending to the most outer portion of the teeth thereby positioning surface 68 radially outward of the spool ratchet teeth with surface 68 contacting pawl 48 to limit cinching as the spool rotates to and from the locking position.

Slot 61 in wall 43 (FIG. 4) extends from slot end 64 to slot end 65 through a fourth included angle 70 which is greater than the angle 52 (FIG. 6) between adjacent teeth. In one embodiment, angle 70 is 210°. In the same embodiment, angle 65 is 330°. In the same embodiment, angle 52 is 72°. Best results are obtained when angle 70 is within a range of 90° and 300°. In the embodiment shown in the drawings, angle 70 is at least 180°.

With the web on the spool fully retracted, the web is wrapped on the spool sufficiently so that the web contacts the pawl forcing the pawl outwardly from the spool teeth. As the web is withdrawn from the web retracted position, the diameter of the web existing on the spool will decrease sufficiently to be spaced apart from the pawl. Simultaneously with the web being withdrawn to a maximum web extended position, cam plate 53 will rotate with the spool in a counterclockwise direction as viewed in FIG. 3 until ear 60 moves from end 64 of slot 61 to end 65 of the slot. Once the ear is positioned adjacent slot end 65, area 58 (FIG. 7) is positioned immediately beneath and against the pawl holding the pawl outwardly apart from the spool teeth. Area 58 thereby forms a lobe area or contact surface extending only a slight distance from locking surface 55 but a sufficient distance to allow the cam plate to hold the pawl outwardly from the spool teeth. Once the tongue mounted to the distal end of the web is locked to a mating buckle and the web is slightly retracted, cam plate 53 will rotate with the spool in a clockwise direction as viewed in FIG. 3 as the web is being slightly retracted. Cam plate area 58 will therefore rotate apart from the pawl allowing the pawl to drop into indented portion 54 contacting locking surface 55 and preventing the retractor from further rotation in a counterclockwise direction and preventing further web extension. In the event tension on the distal end of the web is reduced to provide slack in the web, the spool is operable to retract web into the retractor. Such action will occur in the event the seat is forced downwardly toward the retractor as experienced in a rough ride. Clockwise rotation of the spool through a third angle as the spool withdraws the web will cause clockwise rotation of cam plate 53 as viewed in FIG. 3 allowing the pawl to ride outwardly on surface 56 and onto area 57 thereby positioning the pawl apart from the spool teeth. Area 57 provides a lobe area or contact located immediately adjacent the outwardly slopping surface 56. The circumferential length of area 57 must be sufficient to contact and hold the pawl apart from the spool teeth. Continued retraction of the web with the spool and cam plate rotating in a clockwise direction as viewed in FIG. 3 positions cam surface 68 in contact with and adjacent the pawl eventually positioning ear 60 adjacent slot end 64. Once the ear contacts slot end 64 and if the web is then pulled outwardly the cam plate will reverse rotation with the spool until eventually the pawl is once again located in notch 54 locking the pawl to the tooth previously engaged and positioning the web in the exact same position prior to the release of tension on the web and the retraction of the web resulting in web movement without cinching. On the other hand, once cam plate 53 has rotated sufficiently to position cam surface 68 against pawl 48 and with ear 60 located adjacent slot end 64, continued retraction of the web will result in cam plate 53 slipping relative to spool flange 47 so that when the web is then extended positioning the pawl in notch 54, the spool will not be returned to its original position resulting in cinching or tightening of the web from its original position. Thus, slot 61 along with cam ear 60 provide a web travel limit means which limits web travel once pawl 48 is in locking engagement with the spool and the web moves from the locking position toward the web retracted position and then back toward the locking position thereby allowing the pawl to drop once again into notch 54. The slot and ear limit web extension when the spool is in the locking position and also limit web retraction without cinching once the spool is in the locking position. That is, when the spool is locked, web may not be extended whereas a limited amount of web may be retracted without cinching.

Figure 9:
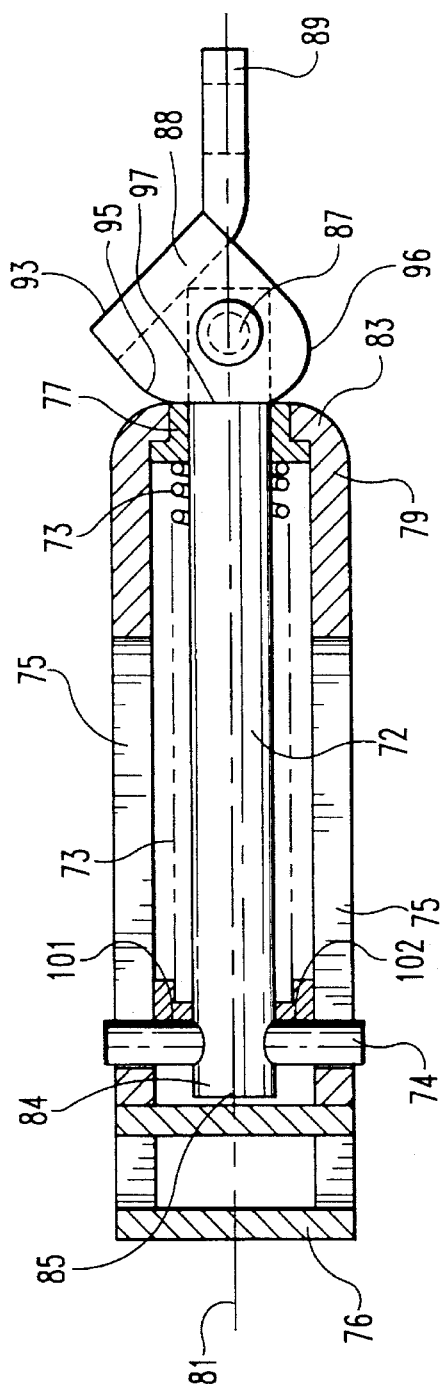
FIG. 9 is a cross-sectional view of a mechanism for reducing belt slack and for automatically orienting the buckle.
Figure 10:
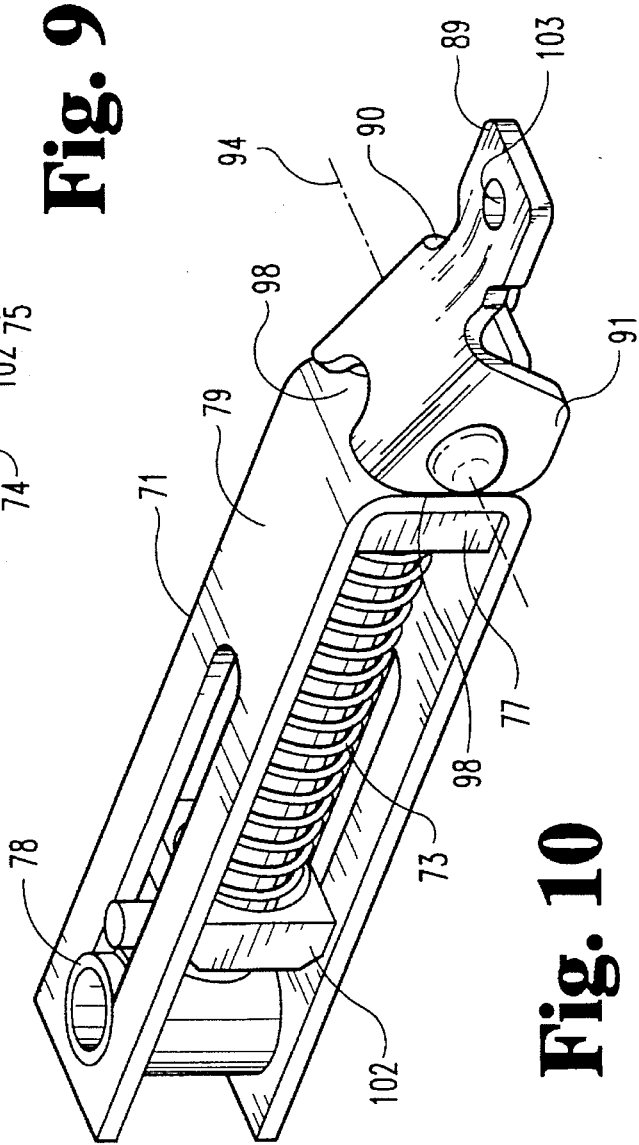
FIG. 10 is a perspective of the mechanism of FIG. 9.
Figure 11:
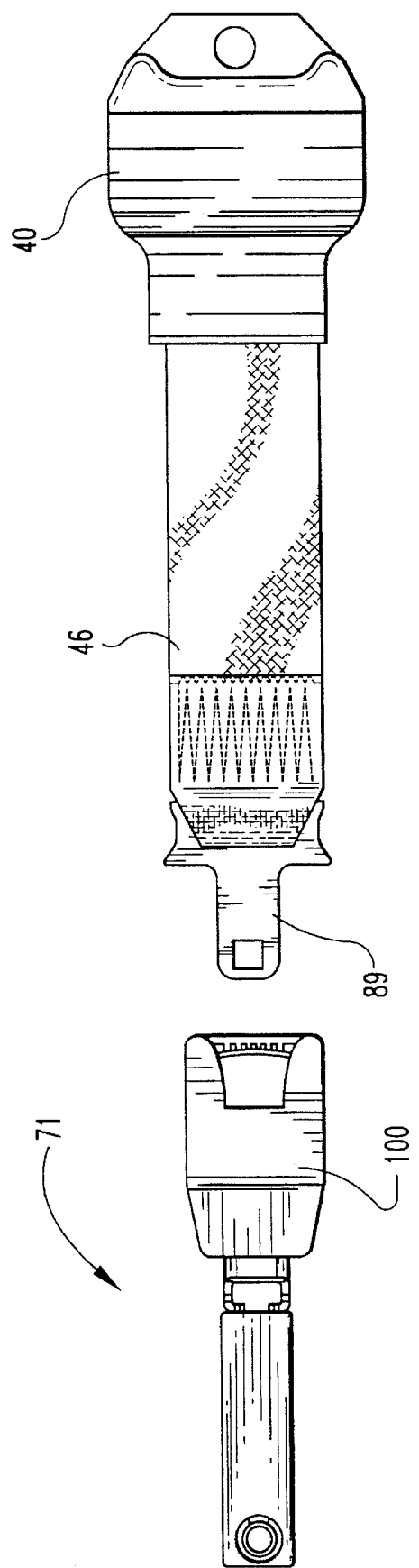
FIG. 11 is a perspective view of the combined devices of FIGS. 3 and 10.

The preferred embodiment of the system for utilizing retractor 40 is depicted in FIG. 11 in combination with a device 71 for further limiting cinching of belt 46 within retractor 40 while also in combination with the retractor limiting chafing movement of belt 46 relative to the occupant. Device 71 (FIGS. 9 and 10) includes an elongated body or housing 79 having a proximal end 76 attachable to the vehicle frame. A hole defined by tube 78 fixedly attached to housing 79 extends through housing 79 to allow a standard fastening device to extend therethrough to facilitate the mounting of the device to the vehicle frame. An elongated member or rod 72 is slidably mounted to housing 79 and has an outer end projectable outwardly through the distal end 83 of housing 79. A pin 74 is fixedly mounted to end portion 84 of member 72 and projects outwardly through a pair of slots 75 provided on the opposite sides of housing 79. A helical spring 73 is mounted to member 72 with one end of the spring abutting bushing 102 positioned adjacent pin 74 and the opposite end of the spring abutting bushing 77 fixedly mounted to end 83 of housing 79. Member 72 extends centrally through the spring. Member 72 extends slidably through bushing 77 which in cooperation with pin 74 and slots 75 maintain the outward and inward motion of member 72 relative to housing 79 along a straight line. Bushing 102 includes a seat 101 receiving one end of spring 73 and is movable along the length of frame 79 with pin 74. Rod 72 extends through bushing 102 with tip 85 of end portion 84 positioned normally adjacent tube 76.

Clevis 88 is pivotally mounted by pins 87 to the outer end of member 72. Buckle 100 is mounted to wall 89 my means of a fastener extending through hole 103 of wall 89. Buckle 100 is shown in FIG. 11 and has been removed from FIGS. 9 and 10 to illustrate the structure of frame 79. The clevis has a pair of walls 90 and 91 fixedly joined to wall 89 and spaced apart from member 72 by bearings. A variety of different types of fastening devices including pins or rivets 87 may be used to secure flanges 90 and 91 to member 72 so long as flanges 90 and 91 along with wall 89 are pivotable about axis 94 extending centrally through fastening devices 87. Flanges 90 and 91 are identical with each having a pair of curved surfaces 95 and 96 between which is positioned a flat or straight surface 97. Surfaces 95 through 97 are formed on the edge of each flange. The outwardly facing surface 98 of frame 79 extends around elongated member 72 and is positioned to contact flat surface 97 when member 72 is pulled inwardly by spring 73. Wall 89 and the buckle mounted thereto are contained in a plane extending in the same direction as longitudinal axis 81 when surface 97 contacts surface 98. Axis 81 extends centrally through member 72. In the event buckle 100 is tilted upwardly as viewed in FIG. 9, thereby positioning curved surface 95 adjacent surface 98, the continued retraction pressure exerted by spring 73 will cause flanges 90 and 91 to pivot in the clockwise direction until surface 97 contacts surface 98 thereby insuring that the buckle projects outwardly in a straight line parallel to axis 81. Similarly, if the buckle is pivoted downward to position curved surface 96 adjacent surface 98, then retraction pressure exerted by spring 73 will cause the flanges and buckle to pivot in a counterclockwise direction until surface 97 is once again adjacent surface 98 insuring that the buckle projects outwardly facilitating the grasping thereof. Surface 97 is located closer to the pivot axis of buckle 89 as compared to the distance between the pivot axis and curved surfaces 95 and 96.

Spring 73 normally buckle 100 in the direction of arrow 99 toward the mounted end 76 of the mechanism thereby taking up any slack existing in belt 46 which may have been caused by rough terrain resulting in belt extension from the retractor. Likewise, spring 73 is yieldable to allow buckle 100 to move in a direction opposite of arrow 99, thereby when coupled with the belt extension from retractor 40 allows for a greater vertical movement of the occupant.

The belt system depicted in FIG. 11 is arranged so that the slack take-up mechanism 71 is mounted to the vehicle frame on one side of the occupant seat whereas retractor 40 is mounted to the opposite side of the vehicle seat. Belt 46 is then pulled from the retractor with the tongue 89 mounted to the distal end of belt 46 then lockingly engaging buckle 100 of mechanism 71. Retractor 40 is identical to the retractor depicted in FIG. 3. Spring 73 is selected to allow flat surface 97 of flanges 90 and 91 to move slightly apart from orientation surface 98 of frame 79 when buckle 100 is locked to tongue 89. Thus, buckle 100 may pivot to an angle relative to longitudinal axis 81 of rod 72 so that buckle 100 is in line with tongue 89. Increased comfort is therefore achieved by the buckle, tongue, and belt conformingly fitting to the occupant. As rough terrain is encountered by the vehicle causing the occupant seat to move upwardly, additional amounts of belt 46 will be withdrawn from the retractor while spring 73 is further compressed allowing the buckle to extend further from housing 79 increasing the excursion. Simultaneously, ear 60 (FIG. 3) will move along slot 61 while cam surface 68 (FIG. 7) contacts and holds pawl 8 (FIG. 3) apart from the spool teeth. As the seat moves downwardly, spring 73 will cause buckle 100 to move in the slack take up direction 99 while ear 60 moves in an opposite direction within slot 61 allowing the belt to be retracted into the retractor 40 without cinching. Simultaneously, relative motion of belt 46 relative to the occupant will be limited due to the positioning of mechanism 71 on one side of the occupant while retractor 40 is positioned on the opposite side of the occupant. Once buckle 100 is unlocked from tongue 89, spring 73 is operable to further move buckle 100 in the direction of arrow 99 until surfaces 97 and 98 contact thereby automatically orienting the buckle to project outwardly along axis 81 facilitating the grasping of the tongue.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A mechanism for a seat belt mountable to a frame comprising:

an elongated main body having a proximal end attachable to the frame and having a distal end, said main body including a orientation surface thereon;

an elongated member slidable mounted to said main body and having an outer end portion with a longitudinal axis and an outer end projectable outwardly from said distal end;

first locking means mounted to said frame;

second locking means releasably lockable with said first locking means, said second locking means movably mounted to said outer end and having a locked position wherein said second locking means is oriented toward said first locking means and further having an unlocked position wherein said second locking means is oriented to project along said longitudinal axis;

a first spring positioned between said main body and said member to normally urge said outer end in a slack take up direction toward said proximal end but yieldable to allow said outer end to move in an opposite direction; and, automatic orientation means connected to said second locking means and said elongated member and operable when moved by said spring in said slack take up direction to contact said orientation surface orienting said second locking means to project along said longitudinal axis.

2. The mechanism of claim 1 and further comprising:

a web mounted to said first locking means; and, a retractor mounted to said frame and having said web wound thereon, said first spring when moving said outer end toward said proximal end operable to take up slack in said web when said first locking means is locked to said second locking means limiting cinching of said retractor.

3. The mechanism of claim 2 wherein:

said retractor is an automatic locking retractor having a frame with a pair of upstanding walls, a web spool having said web wound thereon and rotatably mounted about an axis of rotation to and between said upstanding walls, said spool including a flange rotatable therewith having at least a first locking tooth and a second locking tooth formed thereon and located apart around said axis of rotation by a first included angle, a second spring mounted to said frame and engaged with said spool operable to urge said spool to rotate to a web retracted position but yieldable to allow said spool to rotate to a maximum web extended position, a pawl pivotally mounted to said walls and movable into and out of locking engagement with said flange to limit rotation of said spool in a locking position; and, a cam movably mounted to said frame about said axis of rotation, said cam including a contact surface positionable against said pawl as said spool rotates in a direction from said maximum web extended position to said locking position and a cam surface extending from said contact surface through a second included angle greater than said first included angle with said cam surface positionable against said pawl to limit cinching of said web spool as said spool rotates to and from said locking position through said first included angle.

4. The mechanism of claim 3 wherein:

one of said walls includes an arcuate slot extending partially around said axis through an angle greater than said first included angle relative to said axis; and said cam has an ear thereon extending outwardly into said slot limiting travel of said cam.

5. The mechanism of claim 1 wherein:

said automatic orientation means includes a pivot member pivotally mounted to said outer end of said elongated member with said second locking means including a buckle fixedly mounted to said pivot member, said pivot member further includes a pair of curved surfaces and a middle surface between said curved surfaces, said buckle located in a plane extending in the direction of said longitudinal axis when said spring moves said pivot member against said orientation surface forcing said pivot member to pivot until said middle surface is against said orientation surface.

6. The mechanism of claim 5 wherein:

said main body includes a guide slot; and, said elongated member includes a projection extending into said slot guiding said elongated member during movement along said longitudinal axis.

7. The mechanism of claim 6 wherein:

said orientation surface extends around said elongated member.

8. An anti-cinch and anti-chafe seat belt system for restraining movement of a passenger on a seat in a vehicle comprising:

a seat belt having an inner end and an outer end;

a retractor mounted to said vehicle and having a spool connected to said inner end of said belt, said spool including at least a first locking tooth and a second locking tooth formed thereon and located apart by a first included angle, said retractor further including a pawl movable into and out of locking engagement with said first tooth and said second tooth to limit rotation of said spool, said retractor also including a cam with a cam surface extending through a second included angle greater than said first included angle with said cam surface positionable against said pawl to limit cinching of said web spool as said spool rotates through said first included angle;

a first locking device mounted to said outer end of said seat belt;

a second locking device lockingly engageable with said first locking device; and, biasing means mounting said second locking device to said vehicle, said biasing means limiting cinching of said belt relative to said retractor; and wherein;

said biasing means and said retractor are positioned on opposite sides of the seat limiting chafing movement of said belt relative to the passenger, said biasing means includes:

a main body attachable to the vehicle, said main body has an orientation surface;

a secondary body slidable mounted to said main body with said second locking device movably mounted thereto which has a locked position wherein said second locking device is oriented toward said first locking device and also an unlocked position wherein said second locking device is oriented to project in a resting direction other than toward said first locking device;

a spring extending between said main body and said secondary body to normally urge said second locking device in a slack take up direction but yieldable to allow said second locking device to move in a opposite direction, said biasing means includes automatic orientation means connected to said second locking device and said secondary body and operable when moved by said spring in said slack take up direction to contact said orientation surface orienting said second locking device to project in said resting direction.

9. The system of claim 8 wherein:

said biasing means has a longitudinal axis with said automatic orientation means connected to said second locking device and operable when said first locking device and said second locking device are unlocked to orient said second locking device to project along said longitudinal axis.

10. The system of claim 9 wherein:

said main body has said longitudinal axis extending therethrough, said main body has a proximal end attachable to the vehicle and also has a distal end;

said secondary body has an elongated member slidable mounted to said main body with an outer end portion projectable outwardly from said distal end, said second locking device is movably mounted to said outer end portion and has a locked position wherein said second locking device is oriented toward said first locking device and further has an unlocked position wherein said second locking device is oriented to project along said longitudinal axis;

said spring is positioned between said main body and said member to normally urge said outer end portion in a slack take up direction toward said proximal end but yieldable to allow said outer end portion to move in an opposite direction, said automatic orientation means connected to said second locking device and said elongated member and operable when moved by said spring in said slack take up direction to contact said orientation surface orienting said second locking device to project along said longitudinal axis.

11. An anti-cinch and anti-chafe seat belt system for restraining movement of a passenger on a seat on a frame comprising:

a belt with an outer end and an inner end;

a retractor mounted to the frame and having a spool connected to said inner end of said belt, said spool including at least a first locking tooth and a second locking tooth formed thereon and located apart by a first included angle, said retractor further including a pawl movable into and out of locking engagement with said first tooth and said second tooth to limit rotation of said spool in a locking position, said retractor also including a cam with a cam surface extending through a second included angle greater than said first included angle with said cam surface positionable against said pawl to limit cinching of said web spool as said spool rotates to and from said locking position through a third angle greater than said first included angle;

a first locking device mounted to said outer end of said belt;

a second locking device lockingly engageable with said first locking device; and, combined orientation and biasing means with a longitudinal axis mounting said second locking device to said frame, said combined orientation and biasing means operable to first orient said second locking device to project along said longitudinal axis when said second locking device is unlocked from said first locking device and to second limit cinching of said belt relative to said retractor and also limit chafing movement of said belt relative to the passenger when said second locking device is locked to said first locking device and said combined orientation and biasing means and said retractor are positioned on opposite sides of the seat and wherein:

said combined orientation and biasing means includes a spring, an orientation surface and a pivot member while said second locking device includes a buckle fixedly mounted to said pivot member, said pivot member further includes a pair of curved surfaces and a middle surface between said curved surfaces, said buckle is located in a plane extending in the direction of said longitudinal axis when said spring moves said pivot member against said orientation surface forcing said pivot member to pivot until said middle surface is against said orientation surface.

12. The mechanism of claim 11 wherein:

said retractor includes an upstanding wall with an arcuate slot extending through an angle greater than said first included angle; and said cam has an ear thereon extending outwardly into said slot limiting travel of said cam.

13. The mechanism of claim 12 wherein:

said combined orientation and biasing means includes:

an elongated main body with said longitudinal axis extending therethrough, said main body has a proximal end attachable to the frame and also has a distal end, said main body includes said orientation surface thereon;

an elongated member slidable mounted to said main body with an outer end portion projectable outwardly from said distal end, said second locking device is movably mounted to said outer end portion and has a locked position wherein said second locking device is oriented toward said first locking device and further has an unlocked position wherein said second locking device is oriented to project along said longitudinal axis;

said spring positioned between said main body and said member to normally urge said outer end portion in a slack take up direction toward said proximal end but yieldable to allow said outer end portion to move in an opposite direction, said combined orientation and biasing means connected to said second locking device and said elongated member and operable when moved by said spring in said slack take up direction to contact said orientation surface orienting said second locking device to project along said longitudinal axis.

14. A mechanism for a seat belt mountable to a frame comprising:

a main body having a proximal end attachable to the frame and having an orientation surface thereon;

a secondary body slidable mounted to said main body and having a first portion;

a first lock attachable to the frame;

a second lock releasably lockable with said first lock, said second lock movably mounted to said first portion and having a locked position wherein said second lock is oriented to extend in a first direction toward said first lock and further having an unlocked position wherein said second lock is oriented to extend in a second direction other than said first direction;

a spring extending between said main body and said secondary body to normally urge said first portion in a slack take up direction toward said proximal end but yieldable to allow said first portion to move in an direction opposite of said slack take up direction; and, an orientation component connected to said second lock and said secondary body and operable when moved by said spring in said slack take up direction to contact said orientation surface orienting said second lock to extend in said second direction.

\* \* \* \* \*

UNITED STATES PATENT AND TRADEMARK OFFICE
CERTIFICATE OF CORRECTION

PATENT NO. : 5,516,199

DATED : May 14, 1996

INVENTOR(S) : James E. Crook, Guy R. Dingman, Ronald F. Homeier, and Chris P. Jessup It is certified that error appears in the above-indentified patent and that said Letters Patent is hereby corrected as shown below:

Column 5, line 49 delete the word "withdraws" and replace it with the word --retracts--.

Signed and Sealed this

First Day of October, 1996

Attest:

BRUCE LEHMAN

Attesting Officer

Commissioner of Patents and Trademarks